Patented Apr. 25, 1939

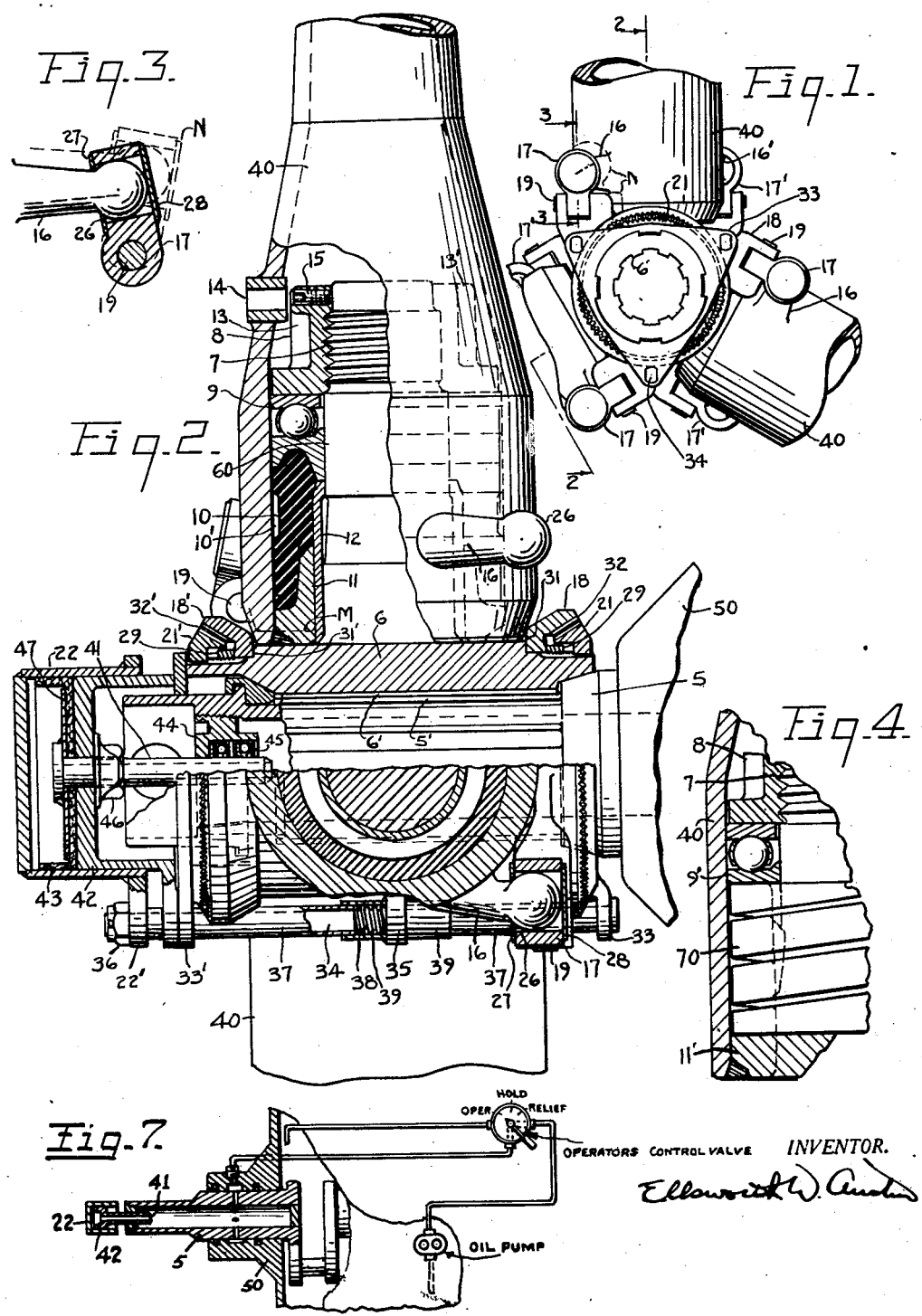

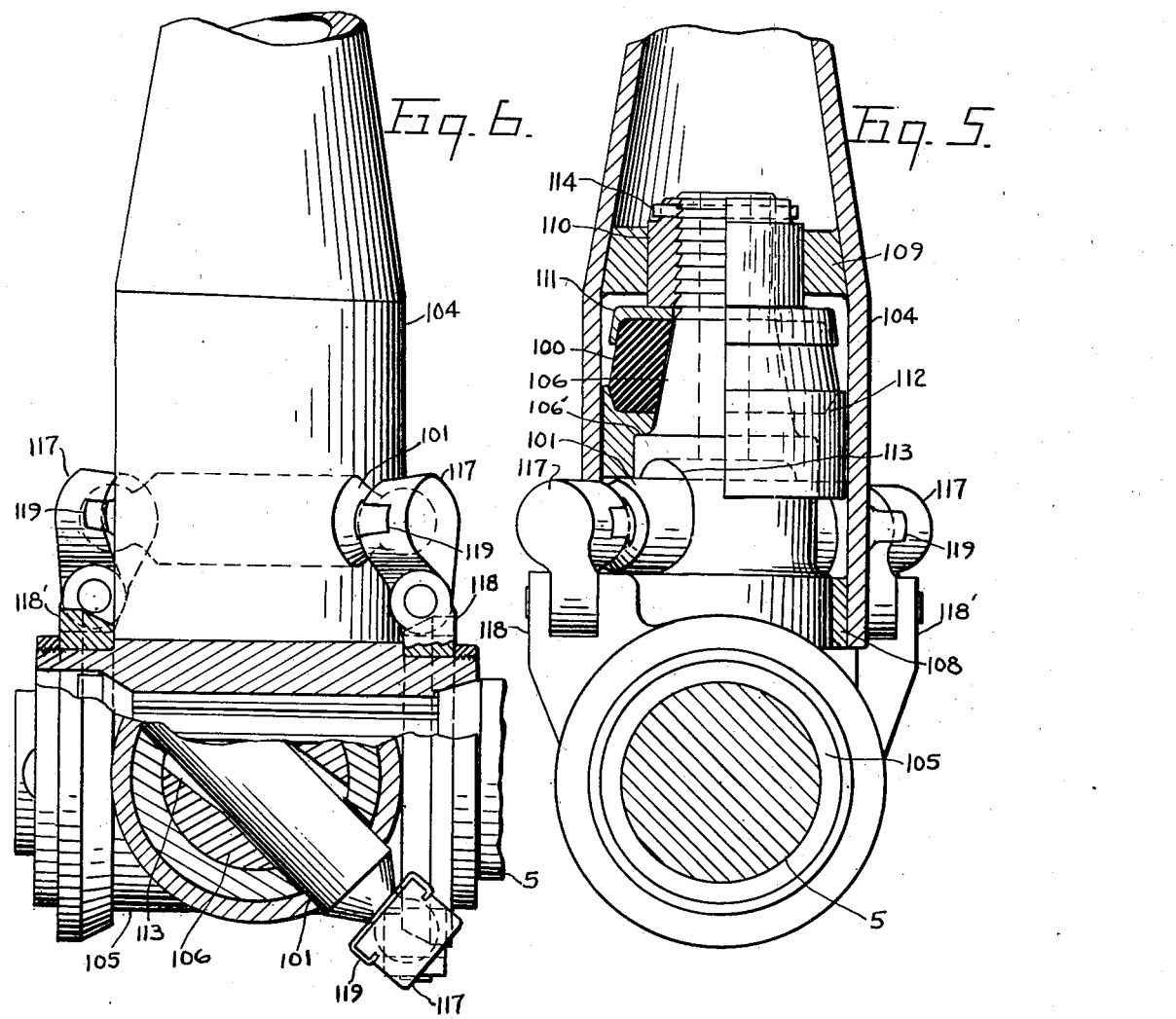

2,156,102

UNITED STATES PATENT OFFICE 2,156,102

PROPELLER

Ellsworth W. Austin, Cedar Rapids, Iowa, assignor to Bendix Products Corporation, South Bend, Ind., a corporation of Indiana Application July 8, 1935, Serial No. 30,301

7 Claims. (Cl. 170—162)

This invention relates to automatic variable pitch propellers and more particularly to the type wherein the blades may be locked in any selected position of adjustment.

Heretofore, automatic variable pitch propellers have been found to be lacking in advantages which are present in propellers that may be controlled by the operator. In certain instances, the pitch of the blades should remain fixed rather than be constantly changing as is the case with most types of automatic propellers. For instance, the operator may wish to accelerate a motor for test, the time interval of acceleration being much too short for the ship to acquire a corresponding increase in headway. In such a case the desired pitch of the blades is less than that obtained under like conditions with most types of automatic propellers. Again, an operator may desire to throttle a motor without slowing up his ship. In this instance, it is desirable to retain a high pitch setting of the blades in order that undue resistance to headway may not be had, as would be the case with most types of automatic propellers in which decreased speed results in a decrease of pitch.

Hence, one of the objects of my present invention is to provide an automatic propeller constructed to embody the advantages above mentioned.

Another object of the invention is to provide resilient means to resist the centrifugal force of the blades in action, and arranged to function automatically to regulate blade action.

Heretofore controllable pitch and automatic propellers have been provided with anti-friction thrust bearings or other like devices to reduce friction in blade adjusting under heavy centrifugal force. My invention provides means whereby the ordinary thrust devices are not required and may be omitted at the discretion of the manufacturer. Hence, another object of my invention is to provide an improved means for securing the blades against centrifugal force for eliminating friction in adjusting.

Another object of the invention is to provide an annular connecting member for simultaneous pitch adjustment of the blades.

Still another object of the invention is to provide an automatic variable pitch propeller having a locking means to retain the blades in any desired position of adjustment.

A further object is to provide an hydraulic or fluid pressure jack suitable to operate in conjunction with the above mentioned locking means.

A further object of the invention is to provide an automatic variable pitch propeller simple in construction, safe and durable in action, light in weight, and which lends itself readily to production methods of manufacture.

These and further objects and novel features of the present invention will be more fully evidenced from a study of the following description and accompanying drawings which do not define the limits of the invention. Like parts are shown in the drawings by like characters throughout the several views:

Fig. 1 is a rear view of a propeller embodying one form of the present invention.

Fig. 2 is an enlarged view partially in section, of the device taken generally along the irregular line 2—2 of Fig. 1.

Fig. 3 is a fragmental view, substantially of the same scale as Fig. 2 and taken along the line 3—3 of Fig. 1.

Fig. 4 is a fragmental view similar to a portion of Fig. 2 disclosing a modification of the present invention.

Fig. 5 is a rear view of a modification of my device, a blade being shown in section.

Fig. 6 is a side view, portions in section and substantially arranged like Fig. 2 but of the modification shown in Fig. 5.

Fig. 7 is a side view, partly in section, of the clutch-operating hydraulic jack and its fluid system.

Briefly referring to the drawings, in Figs. 1 and 2 a propeller hub is arranged as driven by an engine 50 and is illustrated to be directly mounted on an extension of the engine crankshaft 5. The blades illustrated and designated as 40 are of the shell type mounted over hub extensions 60. The blades are secured in place with thrust bearings and nuts and are linked together by annular members 18 and 18' these being connected to blade arms 16 and 16'. Other members 21 and 21' provide clutch means when operated through the medium of a hydraulic jack 22 and are capable of locking the blades firmly in position irrespective of the angle of pitch adjustment at which the blades may then be operating. The hydraulic or fluid pressure jack may be connected to the pressure fluid system usually employed in lubricating an aircraft motor and a conventional type three way valve, shown in Figure 7, may be placed for the convenience of the operator to admit oil to extend the jack 22 to hold in locking position or to release the aforesaid clutch means by allowing a discharge of oil from the jack, as will be readily understood by those versed in the art Referring to Figs. 5 and 6, which illustrate a modification of my device, there is shown a compressible resilient member 100 arranged similarly to 10 in Fig. 2 but in this instance the anti-friction thrust bearing is omitted. A pin member 101 passes completely through each blade 104 piercing the hub extension stub 106 and terminating in links 117 which in turn couple to annular members to function as in the case shown in Figs. 1 and 2. It will be noted that, although in the modification just briefly disclosed, the clutch and hydraulic jack are omitted, these may be applied in connection with this modification if desired, to lock the blades firmly in position as previously mentioned.

A further detailed description of the modification of Figs. 5 and 6 will be found following:

Again referring to Figs. 1 and 2: for the purpose of driving the hub 6, keys or splines 6' are provided in conventional manner to engage mating splines 5' of the aforementioned shaft 5. With the shell blades 40 assembled for service an inwardly extending base collar 11 journals on the rotatable sleeve 12 and with thrust bearing 9 adjusted for service a complete enclosure is provided for a resilient member 10 which is one of the important features of this invention. A gap or air space is preferably arranged at 10' to allow for compressibility within the resilient member when nut 8 is tightened down on the threads 7 which is accomplished, by inserting a bar not shown, through the orifice 14 which is in the form of a bushing piercing the wall of the blade and securely welded thereto. Thus adjustment of the nut for tightening or loosening may be made by rotating the blade with the bar inserted. Slots 13 and 13' are provided to receive the bar and a set screw 15 allows for locking the aforementioned nut 8 securely in place.

In further pointing out the novel method of interconnecting the blades 40 and rotating the same in service, it will be observed that blade arms 16 and 16' are provided with ball ends 26 best illustrated in Fig. 3, which fit within suitable eyes of links 17 and 17' with split ring plates 27 firmly securing the ball ends and plates 28 welded to form complete ball socket closures. Pins 19 are provided as media allowing hinged joints with annular member 18 and with annular member 18'. The annular members being free to rotate on the hub with retaining shoulders at 31 and 31' provided to coact with ring nuts 29 to maintain these members in respective locations. Serrations to form clutch teeth in the annular members are provided at 32 and 32' respectively for the purpose of being engaged by mating teeth of clutch members 21 and 21', the latter members being slidably arranged and drivably splined to the hub. Ear portions at 33 and 33' respectively are pierced by rods 34 which are threaded through suitable eyes at 35 and finally secured with castelled nuts 36 to a suitable projecting ear 22' of the jack cylinder 22. Tubular spacers 37 and springs 38 which are shielded by the permanently secured spring sleeve 39 provide a means for normally holding the clutch members out of engagement with respect to the annular members, the rods being free to slide within their respective spaces.

For conducting fluid to the interior of the jack cylinder, a tubular inlet 41 is provided as a stem or guide for the piston 42 which in turn is provided with a conventional cup packing 43 securely clamped to the piston by washer 47 integrally welded to the head of the inlet member. A nut and lock are provided at 46 to draw the assembled parts snugly together.

Engine crankshafts are often hollow in form and suitable for conducting fluid under pressure from a pump within the crankcase and in referring particularly to Fig. 2 hollow crankshaft 5 has a plug 44 threaded within the forward end and bored suitably to receive the previously described inlet member which slides forward and back with the piston as fluid pressure is applied or withdrawn. Seals 45 are of conventional type to prevent leakage along the sliding exterior of the inlet member.

With particular reference to Fig. 4 wherein a modification of my invention is shown the resilient member is in the form of a spring 70. The lower wall portion of the blade 40 may in this case be somewhat less in thickness than in the preferred form wherein a bursting effect takes place under certain well understood conditions due to displacement of the resilient material. In the case of a spring operated device a suitable modification of the base collar is evidenced in the form shown at 11' the upper surface of which provides a suitable flat spring seat. Likewise, a modification of the thrust bearing is shown in 9' the lower portion of which is also made flat to provide a spring seat.

Again referring to Figs. 5 and 6 for a more detailed description of this modification, it will be seen that a propeller hub 105 is mounted on the splined engine shaft 5. Blades 104, only one of which is shown, are preferably of the shell or hollow type and are provided with bushings 108 at the base to journal on hub extensions 106, and bushings 109 midway of the bore to journal on adjustable nuts 110 which in turn are threaded to the hub extensions and primarily arranged to retain the resilient members 100. Further referring to Fig. 5 an inverted cup-shaped washer 111 is shown to restrict the compressible resilient member on the nut side and likewise a cup member 112 is arranged to act as a compression member and is further arranged to normally seat upon the shoulder at 106' and be slidable on the ground shank of the hub extension. The pin member 101 is arranged to bear on the base portion of the cup member 112 and clearance for movement in respect to the hub is provided in the oblong hole 113 where the pin pierces the hub extension.

In assembling the device, the resilient member with both cups may be secured in place by the adjustable nut and locked by the cotter 114. Next, the shell blade may be placed over the assembly and the pin member then inserted. Links 117 are similar in type to links 17 described in connection with a previous form and are arranged to fit over the ball ends of the pin to connect to the annular members 118 and 118' which provide means for adjustment of all blades simultaneously, as will be readily understood. Snap retainers 119 are provided at each link to fit snugly about the necks of the ball end pins.

The method of operating my propeller in service is as follows: By throttling the motor the propeller blades exert a relatively small amount of centrifugal force to compress the resilient members and thus due to the link connections with the annular members 18 and 18' the blades automatically assume a low pitch angle suitable for take-off. This condition is represented by the component parts of the propeller being approximately positioned as shown by solid lines in the drawings. The operator may, if he desires, retain the low angle of pitch. He may, in the case of the hydraulically arranged device, open his control valve and allow fluid to enter the jack to extend the cylinder, thus engaging the clutch members 21 and 21' with the co-functioning serrated annular members 18 and 18' to lock the blades in the given position of adjustment. Thus the aircraft motor may be accelerated to its capacity for take off and the desired low pitch of the propeller retained. After the ship has gained considerable headway and it is desired to increase the pitch, the operator's valve may be opened and fluid allowed to discharge from the jack. The serrated clutch teeth are at once released being aided by springs 38 acting on the sleeves 37 and immediately the propeller becomes fully automatic in its functioning. That is, as the speed of rotation is increased the resulting centrifugal force of the blades acts to increase the compression of the resilient members to increase the pitch as previously described. A study of the drawings will reveal that under this new condition the blades will assume a position illustrated by the dotted line at M in Fig. 2 the bottom edge of the blade moving to this point. N in Fig. 1 likewise represents the new position of the annular member with its coacting links. Thus all blades are slightly rotated simultaneously. The dotted lines at N of Fig. 3 further convey this idea. And conversely, as the speed of the propeller is decreased the effect of the resilient members is to cause a decrease of pitch angle for the blades.

To further illustrate the usefulness of my invention a condition of operation may be assumed wherein the operator desires to retain a blade setting of high pitch and at the same time throttle his motor. In this case, the jack is again operated to engage the clutch members, while the rotation of the propeller is yet at a speed sufficient to automatically produce the desired high pitch setting of the blades. Again it will be seen that under the conditions just assumed with the clutching members engaged, the aircraft motor may be operated at any desired speed and yet the high pitch blade setting may be retained.

It will be readily understood by those well acquainted with the art that the features heretofore mentioned fulfil the objects of my invention and further it will be understood that devices constructed in accordance with the features herein shown and described may be fully automatic or controllable at the will of the operator. He, having within his vision a motor speed indicator, may bring the speed of rotation of the propeller to such as to suit his requirements and selectively engage the above described clutch members to control the pitch setting as desired.

Controllable and automatic propellers in general possess a tendency for the blades to turn to a negative or low pitch angle position. This will be readily understood when consideration is given to the distribution of metal in the blade sections and the centrifugal force of rotation being applied to tend to bring all portions of the blade mass into the plane of greatest orbits or the plane at right angles to the center of rotation at the point of connection. There have been devices and arrangements devised heretofore to counteract the above mentioned force; however in the case of my present device no special arrangement need be resorted to. Referring to the annular members provided as a part of my invention, it will be seen with connections made with links considerably offset from the center line of the blade to which they connect, a very considerable turning effort is set up in the annular members tending to increase the pitch of blades as the centrifugal force of rotation overcomes the resistance offered by the compressible resilient member. Further, with my present device the rate of resistance or amount of resistance per unit amount of compression may be controlled by the design of the resilient member and the adjustment of the retaining nut.

There is provided by the present invention a novel automatic variable pitch type propeller capable of controllability at any desired setting for the propeller blades and while there has been shown and described only certain forms of the invention it is understood that the same is not limited thereto but may be embodied in various mechanical forms and that various changes may be made in the relation and design of component parts without departing from the spirit thereof. Consequently, I desire that the scope of my invention be determined only by reference to the appended claims.

I claim as my invention:

1. An aerial vehicle having an adjustable pitch propeller, means for adjusting the pitch of the propeller responsive to speed, means including a clutch for selectively securing the adjustment, a fluid operated jack means including a cylinder and a piston, the piston having a tubular stem for conveying fluid to the interior of the cylinder, operator's control means including a valve for permitting fluid to pass through the stem to extend the cylinder, and means for operating the clutch by action of the jack.

2. An aerial vehicle having an adjustable pitch propeller, means for adjusting the pitch of the propeller responsive to speed, means including a pair of clutches for selectively securing the adjustment, a fluid operated jack means including a cylinder connected to one clutch and a piston connected to the other clutch, the piston having a tubular stem for conveying fluid to the interior of the cylinder, operator's control means including a valve for permitting fluid to pass through the stem to extend the cylinder, and means for operating the clutch by action of the jack.

3. An adjustable pitch propeller comprising a hub and blades movably mounted thereon for automatic adjustment in accordance with the speed of rotation of the propeller, a pair of annular members rotatably mounted on the hub, links connecting the annular members to the blades whereby the blades adjust themselves simultaneously, clutch surfaces on the annular members, clutch members non-rotatably secured to the hub and engageable with said clutch surfaces, and fluid jack means having a cylinder connected to one clutch member and a piston connected to the other clutch member for engaging said clutches to lock the annular members in any position which they may assume during adjustment.

4. An adjustable pitch propeller comprising a hub and blades movably mounted thereon for automatic adjustment in accordance with the speed of rotation of the propeller, a pair of annular members rotatably mounted on the hub, links connecting the annular members to the blades whereby the blades adjust themselves simultaneously, clutch surfaces on the annular members, clutch members non-rotably secured to the hub and engageable with said clutch surfaces, fluid jack means having a cylinder connected to one clutch member and a piston connected to the other clutch member for engaging said clutches to lock the annular members in any position which they may assume during adjustment, and control means for admitting fluid under pressure to or discharging fluid from said jack to engage or disengage said clutches.

5. An aircraft propeller having a hub and a plurality of blade elements arranged for automatic adjustment to increase their pitch angle in accordance with increase of speed of rotation of the propeller, a pair of annular members rotatably mounted on the hub one in front and one in back of the blades, pin members projecting through the bases of the blades in a generally fore and aft direction, links connecting each end of the pins to one of the annular members arranged so that when the pitch of one blade tends to change, the annular members rotate to synchronize the change in pitch of all the blades, and means for locking the annular members against further rotation to secure the blades in any position which they may assume.

6. An aircraft propeller having a hub and a plurality of blades, pins projecting through the bases of the blades, washers secured on the blades by the pins, resilient members confined between the washers and portions of the hub to resist radial movement of the blades under the influence of centrifugal force, a pair of annular members rotatably mounted on the hub, links connecting each end of each pin with one of said annular members constructed and arranged to rotate the blades in synchronism when they move radially, and locking means secured to the hub and engageable with the annular members.

7. In an adjustable pitch propeller having a blade and hub, means for preventing change in pitch of the propeller blade after adjustment to any desired position, comprising a pair of members operatively connected with said blade, a clutch cooperative with each member, a fluid pressure cylinder connected with one of said clutches, and a fluid operative piston in said cylinder connected with the other clutch.

ELLSWORTH W. AUSTIN.